(12) United States Patent
Bohn

(10) Patent No.: US 7,071,920 B2
(45) Date of Patent: Jul. 4, 2006

(54) METHOD AND APPARATUS FOR INDICATING AN OPERATING MODE OF A COMPUTER-POINTING DEVICE

(75) Inventor: David D. Bohn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 09/900,211

(22) Filed: Jul. 6, 2001

(65) Prior Publication Data

US 2003/0006965 A1    Jan. 9, 2003

(51) Int. Cl.
*G09G 5/08* (2006.01)
(52) U.S. Cl. .................. 345/163; 345/161; 345/167
(58) Field of Classification Search ........ 345/161–167, 345/156; 200/6 R, 6 A; 250/221, 222.1; 348/734; D14/402–410, 417; 463/37; 715/859
See application file for complete search history.

(56) References Cited

U.S. PATENT DOCUMENTS

| | | | | |
|---|---|---|---|---|
| 3,938,138 A | * | 2/1976 | Kojima et al. ............... | 345/211 |
| 5,517,211 A | * | 5/1996 | Kwang-Chien ............. | 345/166 |
| 5,574,480 A | * | 11/1996 | Pranger et al. ............. | 345/166 |
| 5,734,372 A | * | 3/1998 | Verstockt .................... | 345/163 |
| 5,841,425 A | * | 11/1998 | Zenz, Sr. .................... | 345/163 |
| 5,998,751 A | * | 12/1999 | Brunelle .................... | 209/573 |
| 6,069,594 A | * | 5/2000 | Barnes et al. .................. | 345/7 |
| 6,172,354 B1 | * | 1/2001 | Adan et al. ................. | 250/221 |
| 6,304,249 B1 | * | 10/2001 | Derocher et al. ........... | 345/163 |
| 6,486,873 B1 | * | 11/2002 | McDonough et al. ....... | 345/163 |
| 6,559,830 B1 | * | 5/2003 | Hinckley et al. ........... | 345/157 |
| 6,623,194 B1 | * | 9/2003 | Lip ............................ | 400/472 |
| 6,650,322 B1 | * | 11/2003 | Dai et al. .................... | 345/212 |

OTHER PUBLICATIONS

"Microsoft Mice" product brochure from Microsoft website, dated Feb. 27, 2001, 11 pages.

* cited by examiner

*Primary Examiner*—Ricardo Osorio

(57) ABSTRACT

A computer-pointing device may comprise a first illumination apparatus and a second illumination apparatus. The first illumination apparatus is operatively associated with the computer-pointing device and generates light when the computer-pointing device is in a first operating mode. The second illumination apparatus is operatively associated with the computer-pointing device and generates light when the computer-pointing device is in a second operating mode.

20 Claims, 2 Drawing Sheets

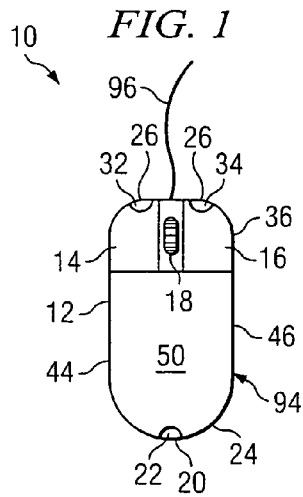
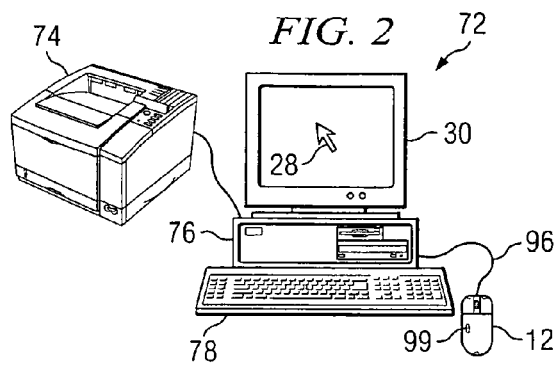
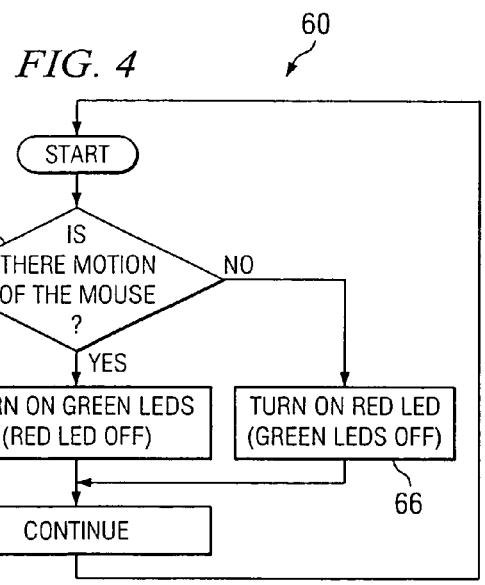
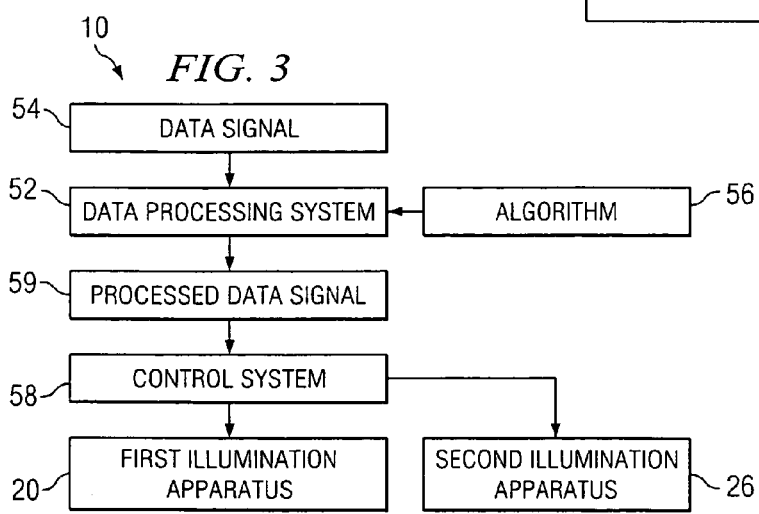

METHOD AND APPARATUS FOR INDICATING AN OPERATING MODE OF A COMPUTER-POINTING DEVICE

FIELD OF INVENTION

This invention relates generally to computer-pointing devices and more specifically to a method and apparatus for indicating an operating mode of a mouse.

BACKGROUND

Many different types of computer-pointing devices exist and are being used to input or enter commands into computers. Such computer-pointing devices may be used, among other things, to control an on-screen cursor (i.e., the arrow or other on-screen icon that moves with corresponding movements of the computer-pointing device) for performing such actions as "pressing" on-screen buttons in dialog boxes, choosing menu items, and selecting ranges of cells in spreadsheets or groups of words in a document.

The typical computer-pointing device will be provided with a cursor movement control device that allows a user to move a cursor on a computer display screen. For example, the cursor movement control device of a mouse may comprise a rotatable ball and a movement detection device or transducer. More recently, however, optical sensors are being used in mice as the cursor movement control devices.

When the rotatable ball configuration is used, the movement detection device or transducer senses the ball's movement and generates signals indicative of the direction and amount of that movement. The signals are ultimately sent to the computer and converted to cursor movement on the computer display screen.

The computer-pointing device may further include one or more buttons that when pressed change the state of an associated switch and thus permits various commands to be entered into the computer. The nature of the command entered will usually depend upon the position of the cursor on the screen. In other words, the user may select items or choose commands displayed on the computer screen by first positioning the cursor on the desired item or command and then pressing the appropriate button of the computer-pointing device.

To allow the computer-pointing device to communicate with the computer and vice versa, the computer-pointing device may be connected to the computer with an interconnection cable or wire. Alternatively, the computer-pointing device may be wireless. For example, the communications between the computer-pointing device and the computer may take place by radio or infrared without the use of any interconnecting wires or cables.

SUMMARY OF THE INVENTION

A computer-pointing device may comprise a first illumination apparatus and a second illumination apparatus. The first illumination apparatus is operatively associated with the computer-pointing device and generates light when the computer-pointing device is in a first operating mode. The second illumination apparatus is operatively associated with the computer-pointing device and generates light when the computer-pointing device is in a second operating mode.

Also disclosed is a method that comprises: providing a computer-pointing device with a first illumination apparatus and a second illumination apparatus; determining whether the computer-pointing device is in a first operating mode; illuminating the first illumination apparatus if it is determined that the computer-pointing device is in the first operating mode; determining whether the computer-pointing device is in a second operating mode; and illuminating the second illumination apparatus if it is determined that the computer-pointing device is in the second operating mode.

BRIEF DESCRIPTION OF THE DRAWING

Illustrative and presently preferred embodiments of the invention are shown in the accompanying drawing in which:

FIG. 1 is a plan view of the operating mode indicator apparatus according to one preferred embodiment of the present invention as it could be used with a mouse-type computer-pointing device;

FIG. 2 is a pictorial representation of one embodiment of a computer system in which may be used the mouse shown in FIG. 1;

FIG. 3 is a block diagram representation of the components of the operating mode apparatus shown in FIG. 1;

FIG. 4 is a flowchart representation of a method for indicating an operating mode of the mouse shown in FIG. 1;

DETAILED DESCRIPTION OF THE INVENTION

Figure 5:
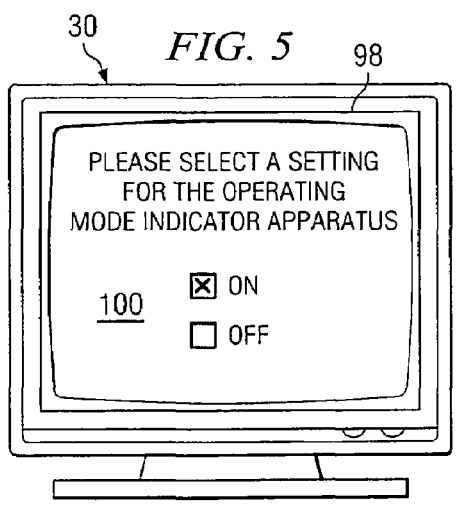
FIG. 5 is a plan view of a screen display that might be presented to a computer user using the operating mode indicator apparatus shown in FIG. 1.

An operating mode indicator apparatus 10 according to one preferred embodiment of the present invention is shown in FIG. 1 and is described herein as it could be used to indicate an operating mode of a mouse-type computer-pointing device 12. For example, the operating mode indicator apparatus 10 may indicate to a user whether the mouse 12 is in a standby mode (e.g., not being used by the user) or in an active or input mode (e.g., being used by the user). The operating mode indicator apparatus 10 may even be able to provide more specific information regarding the operating mode of the mouse 12. For example, the operating mode indicator apparatus 10 may be configured to indicate when the user's hand is in contact with or in close proximity to the mouse 12, when the mouse 12 is being moved, and/or when a mouse button (e.g., first or second mouse button 14 or 16, scrolling wheel 18) has been pressed.

With reference now primarily to FIG. 1, the operating mode indicator apparatus 10 utilized in one preferred embodiment may comprise a first illumination apparatus or lighting device 20. The first lighting device 20 may generate light when the mouse 12 is in a first operating mode or state. In the embodiment shown and described herein, the first lighting device 20 illuminates when the mouse 12 is not being moved. It is generally preferred, but not required, that the first lighting device 20 comprise a red light-emitting diode ("LED") 22 that is positioned adjacent a back portion 24 of mouse 12, although other light sources, colors, and arrangements are possible.

The operating mode indicator apparatus 10 may further include a second illumination apparatus or lighting device 26 that generates light when the mouse 12 is in a second operating mode or state. In the embodiment shown and described herein, the second lighting device 26 illuminates when the mouse 12 is being moved, for example, by the user to move a cursor 28 on a computer display screen 30 (FIG. 2). It is generally preferred, but not required, that the second lighting device 26 comprise a pair of green LEDs 32 and 34 that are positioned adjacent a front portion 36 of mouse 12, although other light sources, colors, and arrangements are possible. See FIG. 1.

To carry out the functionality of the operating mode indicator apparatus 10, a data processing system 52 (FIG. 3) may be provided that is operatively associated with the mouse 12. The data processing system 52 may receive data signals 54 from the mouse 12 that are indicative of the operating mode of the mouse 12. That is, the data signals 54 may provide information, for example, as to when the mouse 12 is being moved, and/or when a mouse button (e.g., first or second mouse button 14 or 16, scrolling wheel 18) has been activated. When the data processing system 52 does receive data signals 54 from the mouse 12, the data processing system 52 may process the data signals 54 in accordance with an algorithm 56.

A control system 58 may receive the processed data signals 59 from the data processing system 52. In response thereto, the control system 58 may actuate (i.e., turn on or off) the appropriate lighting device 20 or 26 of the operating mode indicator apparatus 10.

The operating mode indicator apparatus 10 may be operated in accordance with a method 60 illustrated in FIG. 4. In the first step 62 of method 60, a determination is made as to whether there is motion of the mouse 12. If it is determined at step 62 that the mouse 12 is being moved, the green LEDs 32 and 34 of lighting device 26 are turned on at step 64. However, if it is determined at step 62 that the mouse 12 is not being moved, then the red LED 22 of lighting device 20 is turned on at step 66.

If either of the lighting devices 20 or 26 was illuminated prior to the method 60 being performed, then that lighting device may need to be turned off when the operating mode of mouse 12 changes. Accordingly, step 64 may further comprise turning off the red LED 22 of first lighting device 20. Step 66 may further comprise turning off the green LEDs 32 and 34 of second lighting device 26. Consequently, the user will see only the first lighting device 20 illuminated when the mouse 12 is in the first operating mode and only the second lighting device 26 illuminated when the mouse 12 is in the second operating mode.

A significant advantage of the present invention is that it is easy to use since it allows the user to determine the operating mode of the mouse 12 by simply observing which of the lighting devices 20 or 26, if any, are illuminated. The operating mode indicator apparatus 10 may also allow the user to quickly determine if the work surface upon which the mouse 12 is placed provides enough traction so that the rotatable ball moves when the mouse 12 is moved. As will be explained in greater detail below, the green LEDs 32 and 34 illuminate when the transducer within the mouse 12 senses movement of the rotatable ball. Thus, if the green LEDs 32 and 34 do not illuminate when the mouse 12 is moved upon the work surface, the work surface may not be providing enough friction for proper usage of the mouse 12. Alternatively, if the mouse 12 is an optical mouse, the failure of the green LEDs 32 and 34 to illuminate when the mouse 12 is moved upon the work surface may indicate that the work surface is too reflective for proper use of the mouse 12.

Another significant advantage of the present invention is that it does not require any hardware changes to the computer system itself other than the installation of the mouse 12, or other computer-pointing device, that is equipped with the operating mode indicator apparatus 10. The operating mode indicator apparatus 10 also has the flexibility to be used in conjunction with any of a wide range of other computer-pointing devices, such as trackballs. Finally, the operating mode indicator apparatus 10 provides illumination for the work surface upon which the mouse 12 is placed and also provides an aesthetic quality to the mouse 12.

Having briefly described the operating mode indicator apparatus 10 according to one embodiment of the present invention, as well as some of its more significant features and advantages, the operating mode indicator apparatus 10 will now be described in detail. However, before proceeding with the description, it should be noted that although the operating mode indicator apparatus 10 is shown and described herein as it could be used in conjunction with the mouse 12, it could also be used in conjunction with any of a wide range of other computer-pointing devices such as trackballs, trackpads, graphics tablets, joysticks, light pens, pucks, etc. Consequently, the present invention should not be regarded as limited to use in conjunction with the particular mouse 12 shown and described herein.

With the foregoing considerations in mind, one embodiment of the operating mode indicator apparatus 10 is shown and described herein as it may be used in conjunction with a computer system 72 (FIG. 2) and the mouse 12 connected thereto. The computer system 72 may comprise any of a wide range of computer systems now known in the art or that may be developed in the future. For example, the computer system 72 in which the mouse 12 may be used may include the monitor 30, a printer 74, a processing unit 76, and a keyboard 78, although other arrangements are possible.

Referring back to FIG. 1, the mouse 12 which may be used with the computer system 72 may be provided with a housing or casing 94 that is sized to be held or gripped by one hand of the user. The housing 94 may include a top surface 50, a bottom surface (not shown), and opposed side portions 44 and 46.

The mouse 12 may also include a multidirectional detection device (not shown) such as an optical sensor, a rotatable ball mounted to the base of the mouse 12, or a combination thereof. Assuming that the mouse 12 is provided with the rotatable ball, a portion of the rotatable ball may extend outwardly from the lower surface of the housing 94 so that it may frictionally engage a work surface (not shown), such as a desktop or mouse pad, and be caused to rotate when the mouse 12 is moved with respect to the work surface.

The mouse 12 may further include a transducer (not shown) that senses the ball's movement and generates signals indicative of the direction and amount of that movement. That is, the transducer converts the translational motion of the mouse 12 into position signals. The signals are ultimately sent to the computer system 72 and used to move the cursor 28 on the display screen 30 in a manner that reflects the relative movement of the mouse 12 against the work surface.

The mouse 12 may also be provided with the mouse buttons 14 and 16 that when pressed changes the state of an associated switch and thus permits the entry of various commands into the computer system 12. The nature of the command entered will usually depend upon the position of the cursor 28 on the screen 30. In other words, the user may select items or choose commands displayed on the computer screen 30 by first using the mouse 12 to place the cursor 28 on the desired item or command and then pressing the appropriate mouse button 14 or 16 thereby producing what is known as a "mouse click." In the embodiment shown and described herein, the buttons 14 and 16 are positioned on the top surface 50 adjacent the front portion 36 of the housing 94, although such need not be case.

The mouse 12 may also be provided with the scrolling wheel 18. In the embodiment shown and described herein, the scrolling wheel 18 is mounted on an axle (not shown) positioned within the housing 94 so that the scrolling wheel 18 protrudes from the top surface 50 of housing 94 between the first and second buttons 14 and 16. The mounting arrangement of the scrolling wheel 18 allows the user to both rotate and/or depress the scrolling wheel 18. The scrolling wheel 18 may be coupled to a transducer (not shown) for producing a signal indicating the rotation and/or depression of the scrolling wheel 18. The signal may be used for effecting changes on the display screen 30 such as scrolling through a window displayed on the computer screen 30.

Before proceeding with the description, it should be noted that the foregoing description of the mouse 12 was for illustrative purposes only. That is, the mouse 12 may be provided with any convenient number of activation keys or buttons positioned at any convenient location on the mouse 12. Consequently, the present invention should not be limited to the particular mouse 12 and the arrangement thereof that are shown and described herein.

Continuing now with the description, the mouse 12 may be connected to the computer system 72 via an interconnection cable 96. The interconnection cable 96 allows the mouse 12 and computer system 72 to be in communication with one another. In other words, the mouse 12 and computer system 72 may send and receive signals to and from one another through the interconnection cable 96. The interconnection cable 96 may be plugged into a mouse port (not shown) of the computer system 72 that is dedicated to the mouse 12. If a mouse port is not available, the interconnection cable 96 may instead be plugged into a universal serial bus (USB) port (not shown). Alternatively, the mouse 12 may be attached to the computer's bus (not shown) through a special card or other port, such as a PS/2 port (also not shown). In another alternative embodiment, the mouse 12 may be wireless. That is, the communications between the mouse 12 and computer system 72 may take place through radio, infrared, etc. without the need for an interconnection wire or cable.

The interconnection cable 96 may also be used to provide power to the mouse 12. Alternatively, the mouse 12 may be provided with an internal power source (e.g., a battery).

Regardless of the particular arrangement for the mouse 12, the operating mode indicator apparatus 10 according to one embodiment may comprise the first illumination apparatus or lighting device 20. The first lighting device 20 may generate light when the mouse 12 is in the first operating mode or state. In the embodiment shown and described herein, the first lighting device 20 illuminates when the user is not moving the mouse 12, or more specifically, not moving the rotatable ball or other cursor movement control device of mouse 12. Alternatively, the first operating mode may comprise any of a wide range of other operating modes for the mouse 12 as would be obvious to persons having ordinary skill in the art after having become familiar with the teachings of the present invention. For example, disabling the scrolling wheel 18 of mouse 12 may comprise the first operating mode of mouse 12.

It is generally preferred, but not required, that the first lighting device 20 comprise the LED 22. Alternatively, the first lighting device 20 may comprise any of a wide range of other light sources as would be obvious to persons having ordinary skill in the art after having become familiar with the teachings of the present invention.

It is also preferable to have the first lighting device 20 produce light having at least one attribute (e.g., color, intensity, blink speed, hue, saturation, brightness, etc.) different than the light produced by the second lighting device 26, although such is not required. For example, in the embodiment shown and described herein, the first lighting device 20 comprises the red LED 22 that produces red-colored light while the second lighting device 26 produces green-colored light. Alternatively, the first lighting device 20 could produce broadband light that travels through a red filter so that the user observes it as red-colored light.

The first lighting device 20 may be mounted directly to the back portion 24 of the housing 94 so that light produced thereby will be visible to the user. Alternatively, the first lighting device 20 may be mounted within the housing 94 and positioned adjacent an aperture (not shown) defined by the housing 94 so that the light produced by the first lighting device 20 passes through the aperture and is observable by the user. Still yet other mounting arrangements are possible as would be obvious to persons having ordinary skill in the art after having become familiar with the teachings of the present invention.

The operating mode indicator apparatus 10 may further include the second illumination apparatus or lighting device 26 that generates light when the mouse 12 is in the second operating mode or state. In the embodiment shown and described herein, the second lighting device 26 illuminates when the mouse 12 is being moved, or more specifically, when the transducer within the mouse 12 detects movement of the rotatable ball or other cursor movement control device. Alternatively, the second operating mode may comprise any of a wide range of other operating modes for the mouse 12 as would be obvious to persons having ordinary skill in the art after having become familiar with the teachings of the present invention. For example, the second lighting device 26 may generate light whenever a mouse click is produced.

It is generally preferred, but not required, that the second lighting device 26 comprise the pair of LEDs 32 and 34. Alternatively, the second lighting device 26 may comprise any of a wide range of other light sources as would be obvious to persons having ordinary skill in the art after having become familiar with the teachings of the present invention.

It also preferable to have the second lighting device 26 produce light having at least one attribute (e.g., color, intensity, blink speed, hue, saturation, brightness, etc.) different than the light produced by the first lighting device 20, although such is not required. For example, in the embodiment shown and described herein, the second lighting device 26 comprises the green LEDs 32 and 34 that produce green-colored light while the first lighting device 20 produces red-colored light. Alternatively, the second lighting device 26 could produce broadband light that travels through a green filter so that the user observes it as green-colored light.

The LEDs 32 and 34 of second lighting device 26 may be mounted directly to the front portion 36 of the housing 94 so that light produced thereby will be visible to the user. Alternatively, the LEDs 32 and 34 of second lighting device 26 may be mounted within the housing 94 and positioned adjacent a pair of apertures (not shown) defined by the housing 94 so that the light produced by the LEDs 32 and 34 passes through the apertures and is observable by the user. However, other mounting arrangements are possible as would be obvious to persons having ordinary skill in the art after having become familiar with the teachings of the present invention.

To carry out the functionality of the operating mode indicator apparatus 10, the data processing system 52 (FIG. 3) may be provided. More specifically, and as will be explained in greater detail below, the data processing system 52 implements the functionality of the operating mode indicator apparatus 10 by first receiving from the mouse 12 the data signals 54 that are indicative of the operating mode or status of the mouse 12. For example, the data signals 54 may provide information as to when the mouse 12 is being moved, or more specifically, when the transducer within the mouse 12 detects movement of the rotatable ball or other cursor movement control device of mouse 12. If the mouse 12 is in the first operating mode (i.e., not being moved), the data processing system 52 may receive data signals 54 indicative of the non-moving state of the mouse 12. When the data processing system 52 does receive data signals 54 from the mouse 12, the data processing system 52 may process the data signals 54 in accordance with the algorithm 56.

It is generally preferred, but not required, that the data processing functions for the operating mode indicator apparatus 10 occur within the mouse 12 itself. That is, the data processing system 52 may be built into or reside within the housing 94 of mouse 12. Alternatively, the data processing functions may occur within the processor 76 of the computer system 72. In other words, computer readable program code may be provided that carries out the various data processing functions. Such program code may be contained within a computer readable storage device and be operated on the processor 76. In another alternative embodiment, a device (not shown) specially designed (e.g., "hard wired") may be provided that is operatively associated with the mouse 12 and the operating mode indicator apparatus 10. The specially designed device may process the data signals 54 produced by the mouse 12. In yet another alternative embodiment, the data processing functions may be split between the mouse 12 and the CPU 76 of computer system 72 with each performing portions of the processing functions. In any event, a suitable arrangement for the data processing system 52 may be easily arrived at by persons having ordinary skill in the art after considering the requirements for the particular application and after becoming familiar with the teachings of the present invention.

The data processing system 52 may comprise any of a wide range of data processing systems that are well known in the art. Accordingly, the present invention should not be regarded as limited to any particular type of data processing system. Moreover, since data processing systems are well known in the art and the details of data processing systems themselves are not necessary to understand the present invention, the particular data processing system utilized in one preferred embodiment of the present invention will not be described in further detail herein.

Regardless of the type of data processing system that is utilized, if any portion of the data processing system 52 resides outside of the housing 94 of mouse 12, it is generally desirable to provide the data processing system 52 with one or more communication ports (not shown) to allow data to be transferred or "downloaded" from the mouse 12 to the data processing system 52. While any of a wide range of well known communication ports and formats may be utilized, in one preferred embodiment, the data processing system 52 may be provided with a universal serial bus (USB) port (not shown), an infra red (IR) serial port (also not shown), and/or BLUETOOTH™.

As just mentioned, the data processing system 52 may process the data signals 54 in accordance with the algorithm 56. The algorithm 56 may be stored within the mouse 12, for example, within the data processing system 52 just described. Alternatively, the algorithm 56 may comprise computer readable program code stored on a computer readable storage device of computer system 72.

Assuming now that the data signals 54 have been processed by the data processing system 52, the processed data signals 59 may be received by the control system 58. In response thereto, the control system 58 may actuate (i.e., turn on or off) the appropriate lighting device 20 or 26 of the operating mode indicator apparatus 10.

The operating mode indicator apparatus 10 may also be provided with a power source. It is generally preferred, but not required, that the operating mode indicator apparatus 10 be provided with a power source that is not dependent on the operational status of the computer system 72. For example, in one preferred embodiment, the mouse 12 and the operating mode indicator apparatus 10 are both powered by a battery (not shown) positioned within the housing 94 of mouse 12. Alternatively, the operating mode indicator apparatus 10 may receive its power (e.g., through interconnection cable 96) from the same source that powers the computer system 72.

If the power source for the operating mode indicator apparatus 10 is not dependent on the operational status of the computer system 72, it is generally preferred that the operating mode indicator apparatus 10 be provided with a time-delayed shut off switch 99 so that the operating mode indicator apparatus 10 does not remain operational for an extended period of time after the computer system 72 is shut down. By providing the time-delayed shut off, the operating mode indicator apparatus 10 may be shut off without any user intervention after a period of inactivity. That is, the operating mode indicator apparatus 10 may be shut off if the mouse 12 has not been used for a given period of time period and/or the computer system 72 has been inoperable for the given time period.

The operating mode indicator apparatus 10 may also include a switch 98 that allows the user to disable or shut off the operating mode indicator apparatus 10. For example, the user may shut off the operating mode indicator apparatus 10 via switch 98 to conserve power or to simply use the mouse 12 without the operating mode indicator apparatus 10 being operational.

Regardless of the reason for shutting off the operating mode indicator apparatus 10, the switch 98 may be implemented as a user selectable interface 100 (e.g., icon or dialog box) that is displayed on the computer display screen 30. See FIG. 5. The user selectable interface 100 allows the user to select between the "ON" and "OFF" settings for the operating mode indicator apparatus 10 by simply marking the appropriate box on the computer display screen 30 with the mouse 12, or other computer-pointing device. For example, FIG. 5 shows that the user has selected the "ON" setting for the operating mode indicator apparatus 10.

The computer system 72 may be programmed in accordance with any of a wide range of programming methods that are now known in the art or that may be developed in the future that will allow the computer system 72 to display the user selectable interface 100. That is, a user could easily program the computer system 72 to display the user selectable interface 100 after having become familiar with the teachings of the present invention. Accordingly, the details associated with programming the computer system 72 to display the user selectable interface 100 will not be further discussed herein.

In an alternative embodiment, the switch 98 may comprise a switch (not shown) that is mounted to the housing 94 of mouse 12. In such an embodiment, the switch may be mounted to the housing 94 so that the switch may be moved between "ON" and "OFF" settings.

As discussed above, the operating mode indicator apparatus 10 may be operated in accordance with the method 60 illustrated in FIG. 4. In the first step 62 of method 60, a determination is made as to whether there is motion of the mouse 12. If it is determined at step 62 that the mouse 12 is being moved, the green LEDs 32 and 34 of lighting device 26 are turned on at step 64. However, if it is determined at step 62 that the mouse 12 is not being moved, then the red LED 22 of lighting device 26 is turned on at step 166.

The present invention also contemplates methods including more steps than what are shown in FIG. 4. For example, if either of the lighting devices 20 or 26 was illuminated prior to the method 60 being performed, then that lighting device may need to be turned off when the operating mode of mouse 12 changes. Accordingly, step 64 may further comprise turning off the red LED 22 of first lighting device 20. Step 66 may further comprise turning off the green LEDs 32 and 34 of second lighting device 26. Consequently, the user will see only the first lighting device 20 illuminated when the mouse 12 is in the first operating mode and only the second lighting device 26 illuminated when the mouse 12 is in the second operating mode.

By way of example only, assume that the first lighting device 20 is generating light to indicate the first operating mode of the mouse 12. When the mouse 12 is changed from the first to the second operating mode, the red LED 22 of first lighting device 20 may be turned off at about the same time that the green LEDs 32 and 34 of second lighting device 26 are turned on so that the user sees only the green LEDs 32 and 34 illuminated when the mouse 12 is in the second operating mode.

Figure 6:
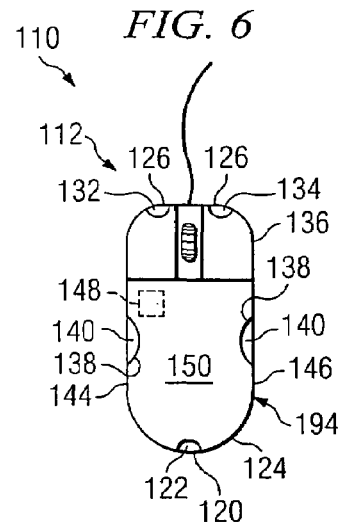
FIG. 6 is a plan view of the operating mode indicator apparatus according to an alternative embodiment of the present invention as it could be used with a mouse-type computer-pointing device.

A second embodiment 110 of the operating mode indicator apparatus is illustrated in FIG. 6 and may include a first illumination apparatus or lighting device 120. The first lighting device 120 may generate light when the mouse 112 is in a first operating mode or state. That is, in the embodiment shown and described herein, the first lighting device 120 illuminates when the user is not touching the mouse 112. It is generally preferred, but not required, that the first lighting device 120 comprise a red light-emitting diode ("LED") 122 that is positioned adjacent a back portion 124 of mouse 112, although other light sources, colors, and arrangements are possible.

The operating mode indicator apparatus 110 may further include a second illumination apparatus or lighting device 126 that generates light when the mouse 112 is in a second operating mode or state. In the embodiment shown and described herein, the second lighting device 126 illuminates when the mouse 112 is being moved. More specifically, the second lighting device 126 generates light when a transducer within the mouse 112 detects movement of the cursor movement control device of mouse 112. It is generally preferred, but not required, that the second lighting device 126 comprise a pair of green LEDs 132 and 134 that are positioned adjacent a front portion 136 of mouse 112, although other light sources, colors, and arrangements are possible.

The operating mode indicator apparatus 110 may also be provided with a third illumination apparatus or lighting device 138 that illuminates when the mouse 112 is in a third operating state or mode. In the embodiment shown and described herein, the third lighting device 138 generates light when the user's hand is in contact with the mouse 112 but the mouse 112 is not being moved, or more specifically, the rotatable ball or other cursor movement control device of mouse 112 is not being moved. It is generally preferred, but not required, that the third lighting device 138 comprise a pair of yellow LEDs 140 and 142 that are positioned on opposed side portions 144 and 146, respectively, of mouse 112, although other light sources, colors, and arrangements are possible.

To determine when the user's hand is in contact with the mouse 112, a user detection device 148 may be provided. The user detection device 148 enables the operating mode indicator apparatus 110 to determine when the user's hand is in contact with the mouse 112. More specifically, the user detection device 148 may send data signals 54 to the data processing system 52 that are indicative of the operating mode or status of the mouse 112.

In the embodiment shown and described herein, the user detection device 148 is positioned on the top surface 150 of housing 194 and comprises an optical sensor. Alternatively, the user detection device 148 may comprise a thermal sensor that detects heat produced by the user's hand. In another alternative embodiment, the user detection device 148 may comprise a mechanically activated switch, such as a pressure-activated switch, that is positioned on the mouse 112 so that the pressure applied to the mouse 112 when the user's hand is placed on the housing 194 activates the switch. In yet another alternative embodiment, the user detection device 148 may comprise a capacitance proximity sensor of the type that is well known in the art and readily commercially available.

Figure 7:
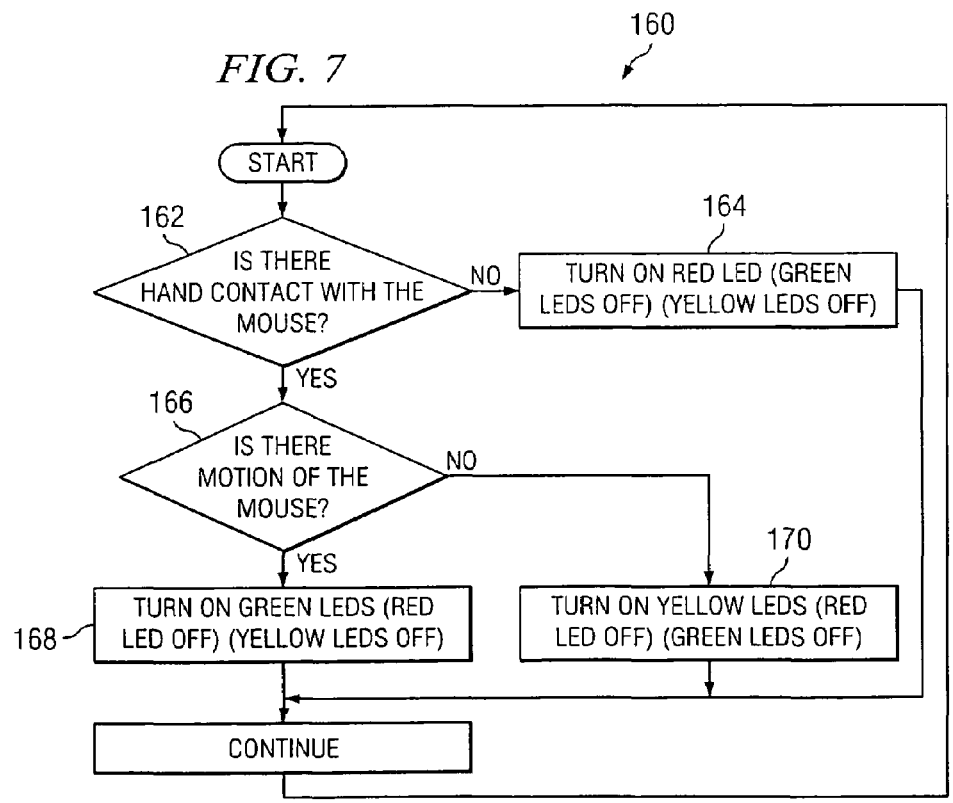
FIG. 7 is a flowchart representation of a method for indicating an operating mode of the mouse shown in FIG. 6.

The operating mode indicator apparatus 110 may be operated in accordance with a method 160 illustrated in FIG. 7. In the first step 162 of method 160, a determination is made as to whether the user's hand is in contact with the mouse 112. If it is determined at step 162 that the user's hand is not in contact with the mouse 112, the red LED 122 of first illumination apparatus 120 is turned on at step 164. But if it is determined at step 162 that the user's hand is in contact with the mouse 112, another determination is made at step 166 as to whether the mouse 112 is being moved. If it is determined at step 166 that the mouse 112 is being moved, the green LEDs 132 and 134 of second illumination apparatus 126 are turned on at step 168. However, if it is determined at step 166 that the mouse 112 is not being moved, then the yellow LEDs 140 and 142 of third illumination apparatus device 138 are turned on at step 170.

As before with method 60 (FIG. 4), if any of the lighting devices 120, 126, and 138 of operating mode indicator apparatus 110 were illuminated prior to the method 160 being performed, then that lighting device may need to be turned off when the mouse 112 changes operating modes. Accordingly, step 164 may further comprise turning off the green LEDs 132 and 134 of lighting device 126 and/or turning off the yellow LEDs 140 and 142 of lighting device 138. Step 168 may further comprise turning off the red LED 122 of lighting device 120 and/or turning off the yellow LEDs 140 and 142 of lighting device 138. And, step 170 may further comprise turning off the green LEDs 132 and 134 of lighting device 126 and/or turning off the red LED 122 of lighting device 120. Consequently, the user will see only the first lighting device 120 illuminated when the mouse 112 is in the first operating mode, only the second lighting device 126 illuminated when the mouse 112 is in the second operating mode, and only the third lighting device 138 when the mouse 112 is in the third operating mode.

In an alternative embodiment that is not shown, the operating mode indicator apparatus may include a single illuminating apparatus or lighting device (not shown) that is used to indicate the various operating modes for the mouse. More specifically, the single lighting device may generate light for a certain operating mode that has at least one attribute (e.g., color, intensity, blink speed, hue, saturation, brightness, etc.) different than the light it generates for the other operating modes of the mouse. For example, the single lighting device may generate a blinking light for a first operating mode of the mouse and may generate a constant light for a second operating mode of the mouse.

The functionality of the operating mode indicator apparatus 10 could also be carried even further. That is, the operating mode apparatus could be programmed and/or provided with additional lighting devices to indicate any of a wide range of other operating modes of the mouse 12. For example, the first and second lighting devices 20 and 26 could be used in combination to indicate a fourth operating mode of mouse 12, the green LED 32 may illuminate when the first mouse button 14 is pressed, and/or the green LED 34 may illuminate when the second mouse button 16 is pressed.

Moreover, since it is sometimes necessary or desirable for the user to change the operating mode or settings of the computer-pointing device, the operating mode indicator apparatus could be used to assist the user in making such changes. For example, the user may be required to disable the scrolling wheel 18 of the mouse 12 before using the mouse 12 to play a video game. To disable the scrolling wheel 18, the user may first have to access a computer program. While using the computer program, however, the user may have no way of knowing whether the scrolling wheel 18 has actually been disabled until the user later uses the mouse 12. If the user does discover that the scrolling wheel 18 was not properly disabled, the user may be required to undergo the timely process of again accessing the computer application and then re-attempting to disable the scrolling wheel 18. This time consuming process, however, could have been avoided if the mouse 12 had been provided with an operating mode indicator apparatus having a lighting device that illuminates when the scrolling wheel 18 is disabled. In other words, the user could have quickly determined whether the scrolling wheel 18 was disabled by observing which, if any, of the illumination apparatus comprising the operating mode indicator apparatus was generating light. Alternatively, the operating mode indicator apparatus could also be used to indicate any of a wide range of other settings or operating modes for the mouse 12 as would be obvious to persons having ordinary skill in the art after having become familiar with the teachings of the present invention.

It is to be understood that the computer readable program code described herein can be conventionally programmed using any of a wide range of suitable computer readable programming languages that are now known in the art or that may be developed in the future. It is also to be understood that the computer readable program code can include one or more functions, routines, subfunctions, and subroutines, and need not be combined in a single software package.

It is contemplated that the inventive concepts herein described may be variously otherwise embodied and it is intended that the appended claims be construed to include alternative embodiments of the invention except insofar as limited by the prior art.

What is claimed is:

1. A computer-pointing device, comprising:
    a first illumination apparatus operatively associated with the computer-pointing device, said first illumination apparatus generating light when the computer-pointing device is in a standby mode, the light generated by said first illumination apparatus providing for a user a visual indication of the standby mode of the computer-pointing device; and
    a second illumination apparatus operatively associated with the computer-pointing device, said second illumination apparatus generating light when the computer-pointing device is in an input operating mode, the light generated by said second illumination apparatus providing for the user a visual indication of the input operating mode of the computer-pointing device.

2. The computer-pointing device of claim 1, wherein the computer-pointing device comprises a mouse.

3. The computer-pointing device of claim 1, wherein said first illumination apparatus comprises a light-emitting diode, and wherein said second illumination apparatus comprises a light-emitting diode.

4. The computer-pointing device of claim 1, wherein said first illumination apparatus generates light having at least one attribute different than the light generated by said second illumination apparatus.

5. The computer-pointing device of claim 1 further comprising a third illumination apparatus operatively associated with the computer-pointing device, said third illumination apparatus generating light when the computer-pointing device is in another mode different from the standby mode and the input operating mode, the light generated by said third illumination apparatus providing for the user a visual indication of another mode of the computer-pointing device.

6. The computer-pointing device of claim 5, wherein said first illumination apparatus generates light when the computer-pointing device is not in contact with the user, wherein said second illumination apparatus generates light when the computer-pointing device is being moved, and wherein said third illumination apparatus generates light when the computer-pointing device is in contact with the user but the computer-pointing device is not being moved.

7. The computer-pointing device of claim 1, further comprising a switch, said switch allowing the user to disable the first illumination apparatus and the second illumination apparatus.

8. The computer-pointing device of claim 1, further comprising a time-delayed shut off switch, said time-delayed shut off switch causing the first illumination apparatus and the second illumination apparatus to be shut off after a period of inactivity.

9. The computer-pointing device of claim 1, further comprising a user detection device operatively associated with the computer-pointing device, said user detection device detecting when the user is accessing the computer-pointing device.

10. The computer-pointing device of claim 9, wherein said user detection device comprises an optical sensor.

11. The computer-pointing device of claim 9, wherein said user detection device comprises a thermal sensor.

12. The computer-pointing device of claim 9, wherein said user detection device comprises a mechanically activated switch.

13. The computer-pointing device of claim 9, wherein said user detection device comprises a capacitance proximity sensor.

14. The computer-pointing device of claim 1, wherein a data processing system is operatively associated with the computer-pointing device, said data processing system receiving a data signal from the computer-pointing device that is indicative of the operating mode of the computer-pointing device, said data processing system processing the data signal so that said first illumination apparatus generates light when the computer-pointing device is in the standby mode and so that said second illumination apparatus generates light when the computer-pointing device is in the input operating mode.

15. The computer-pointing device of claim 1, further comprising a control system, said control system actuating said first illumination apparatus when the computer-pointing device is in the standby mode, said control system actuating said second illumination apparatus when the computer-pointing device is in the input operating mode.

16. The computer-pointing device of claim 1, wherein said first illumination apparatus and said second illumination apparatus comprise a single illumination apparatus.

17. A method, comprising:
providing a computer-pointing device with a first illumination apparatus and a second illumination apparatus;
determining whether the computer-pointing device is in a standby mode;
illuminating said first illumination apparatus if it is determined that the computer-pointing device is in the standby mode, the illumination of the first illumination apparatus providing for a user a visual indication of the standby mode of the computer-pointing device;
determining whether the computer-pointing device is in an input operating mode; and
illuminating said second illumination apparatus if it is determined that the computer-pointing device is in the input operating mode, the illumination of the second illumination apparatus providing for the user a visual indication of the input operating mode of the computer-pointing device.

18. The method of claim 17, further comprising:
providing the computer-pointing device with a third illumination apparatus;
determining whether the computer-pointing device is in another mode that is different from the standby mode and the input operating mode; and
illuminating said third illumination apparatus if it is determined that the computer-pointing device is in the another mode, the illumination of the third illumination apparatus providing for the user a visual indication of another mode of the computer-pointing device.

19. A computer-pointing device, comprising:
means for providing for a user a first visual indication that the computer-pointing device is in a standby mode; and
means for providing the user a second visual indication that the computer-pointing device is in input operating mode.

20. A computer-pointing device, comprising:
a cursor movement control device, said cursor movement control device allowing a user to move a cursor on display apparatus operatively associated with the computer-pointing device;
a first illumination apparatus, said first illumination apparatus generating light when the computer-pointing device is in a standby mode, the light generated by said first illumination apparatus providing for a user a visual indication of the standby mode of the computer-pointing device; and
a second illumination apparatus, said second illumination apparatus generating light when the computer-pointing device is in an input operating mode, the light generated by said second illumination apparatus providing for the user a visual indication of the input operating mode of the computer-pointing device.

* * * * *